US009664378B2

(12) United States Patent
Vempati

(10) Patent No.: US 9,664,378 B2
(45) Date of Patent: May 30, 2017

(54) ENERGY EFFICIENT PRESSURE LESS STEAM GENERATOR

(71) Applicant: Venkata Sundereswar Rao Vempati, Andhra Pradesh (IN)

(72) Inventor: Venkata Sundereswar Rao Vempati, Andhra Pradesh (IN)

( * ) Notice: Subject to any disclaimer, the term of this patent is extended or adjusted under 35 U.S.C. 154(b) by 9 days.

(21) Appl. No.: 14/428,632

(22) PCT Filed: Jul. 15, 2013

(86) PCT No.: PCT/IN2013/000434
§ 371 (c)(1),
(2) Date: Mar. 16, 2015

(87) PCT Pub. No.: WO2014/170907
PCT Pub. Date: Oct. 23, 2014

(65) Prior Publication Data
US 2016/0025329 A1    Jan. 28, 2016

(30) Foreign Application Priority Data

Apr. 17, 2013    (IN) .......................... 1702/CHE/2013

(51) Int. Cl.
*F24F 6/00*    (2006.01)
*F24F 6/08*    (2006.01)
*F22B 1/28*    (2006.01)

(52) U.S. Cl.
CPC .............. *F22B 1/285* (2013.01); *F22B 1/284* (2013.01)

(58) Field of Classification Search
None
See application file for complete search history.

(56) References Cited

U.S. PATENT DOCUMENTS

| 1,093,406 A | * | 4/1914 | Hamerschlag | ......... F02M 31/18 159/13.3 |
| 1,145,218 A | * | 7/1915 | Schimmel | ............. A61M 16/16 261/100 |
| 1,154,113 A | * | 9/1915 | Hadaway, Jr. | .......... A61L 9/037 126/350.2 |
| 2,447,789 A | * | 8/1948 | Barr | ..................... C23C 14/243 118/726 |
| 2,581,034 A | * | 1/1952 | Lewis | .................... A21C 13/00 219/401 |

(Continued)

FOREIGN PATENT DOCUMENTS

WO    WO 2010/119405    10/2010

*Primary Examiner* — Thor Campbell
(74) *Attorney, Agent, or Firm* — Law Offices of Steven W. Weinrieb

(57) ABSTRACT

An energy efficient electrically operated steam generator is capable of producing pressure less high temperature as well as superheated steam. It comprise of main body (14) defined by side wall, roof (2) and open bottom, securely fixed to the rim of water holding tray (7). Said roof is provided with steam outlet nozzles (16) to allow the steam to emerge out of the steam generator. A porous ceramic honeycomb (3) with plurality of parallel channels (4), and grooves (5) or holes (23) are created therein for inserting heating element (6). One end of all the channels (4) is always submerged in water (11) in tray (7), and the other end of most of the channels is open to the roof and both ends of the heating element are connected to the power source for heating the water to generate steam.

14 Claims, 4 Drawing Sheets

(56) References Cited

U.S. PATENT DOCUMENTS

| | | | | |
|---|---|---|---|---|
| 2,899,532 A * | 8/1959 | Reick | ............ | F24H 1/00 |
| | | | | 392/337 |
| 3,234,357 A * | 2/1966 | Seuthe | ............ | A63H 33/28 |
| | | | | 261/142 |
| 3,927,300 A * | 12/1975 | Wada | ............ | A45D 20/12 |
| | | | | 338/22 R |
| 4,419,302 A * | 12/1983 | Nishino | ............ | F22B 1/284 |
| | | | | 122/487 |
| 4,724,824 A | 2/1988 | McCoy et al. | | |
| 4,801,424 A | 1/1989 | Schweiger | | |
| 5,063,609 A | 11/1991 | Lorimer | | |
| 5,206,476 A * | 4/1993 | Fresch | ............ | B60H 1/2225 |
| | | | | 219/202 |
| 5,771,845 A * | 6/1998 | Pistien | ............ | F22B 1/00 |
| | | | | 122/366 |
| 6,169,852 B1 * | 1/2001 | Liao | ............ | F22B 1/284 |
| | | | | 261/142 |
| 6,175,687 B1 * | 1/2001 | Imamura | ............ | F24F 6/043 |
| | | | | 392/395 |
| 6,607,804 B1 * | 8/2003 | Best | ............ | B01D 46/0001 |
| | | | | 422/177 |
| 6,909,840 B2 * | 6/2005 | Harwig | ............ | A01M 1/2072 |
| | | | | 392/395 |
| 7,674,429 B2 * | 3/2010 | Lins | ............ | A01N 31/02 |
| | | | | 239/145 |
| 7,694,675 B2 * | 4/2010 | Koch | ............ | A61M 16/1075 |
| | | | | 128/203.16 |
| 7,942,644 B2 * | 5/2011 | Young | ............ | F04B 17/00 |
| | | | | 417/207 |
| 8,430,336 B2 * | 4/2013 | Pisklak | ............ | A01M 1/2044 |
| | | | | 222/187 |
| 8,724,973 B2 * | 5/2014 | Yamakage | ............ | C23C 14/243 |
| | | | | 392/386 |
| 8,737,826 B2 * | 5/2014 | Stauffer | ............ | A63J 5/025 |
| | | | | 239/136 |
| 9,383,119 B2 * | 7/2016 | Kida | ............ | H05B 3/141 |
| 9,428,832 B2 * | 8/2016 | Yamakage | ............ | C23C 14/243 |
| 2005/0178761 A1 | 8/2005 | Wakamatsu et al. | | |
| 2010/0078151 A1 * | 4/2010 | Koenigsberg | ............ | F28D 15/046 |
| | | | | 165/104.26 |
| 2010/0201007 A1 * | 8/2010 | Tsuda | ............ | F24F 6/06 |
| | | | | 261/83 |
| 2010/0301128 A1 * | 12/2010 | Pisklak | ............ | A61L 9/127 |
| | | | | 239/6 |
| 2011/0274416 A1 | 11/2011 | Chen | | |
| 2012/0187586 A1 * | 7/2012 | Tsuda | ............ | F24F 6/06 |
| | | | | 261/30 |
| 2015/0083373 A1 * | 3/2015 | Dupont | ............ | F28D 15/046 |
| | | | | 165/104.26 |
| 2015/0084215 A1 * | 3/2015 | Ojeda | ............ | F24F 6/043 |
| | | | | 261/71 |

* cited by examiner

ENERGY EFFICIENT PRESSURE LESS STEAM GENERATOR

FIELD OF INVENTION

This invention relates to an energy efficient electrically operated pressure less steam generator having a housing, with one or more heating electrodes introduced into low body density Ceramic honeycombs with their channels vertically oriented and parallel to one another with one end of all the channels resting in a tray of water with limited water level wherein water never exceeding this level such that these electrical resistance heating electrodes that are always at least 10 millimeters above the water level. More especially it is capable of producing pressure less superheated steam by introducing secondary electrical heater at a height of more than one inch over the ceramic honeycomb in such a fashion that most of the steam passes through the said secondary heater coil arrangement and thus increase the steam temperature.

BACKGROUND OF THE INVENTION

Many methods have been devised to generate steam and many are working even today. Most of these steam generators are bulky, complicated, and are not easily portable due to the water reservoir, boilers and pressure vessels involved etc while the efficiency of the systems is also low as most of the stored water has to be continuously boiled or heated and kept hot throughout the evaporation process.

U.S. Pat. No. 4,801,424 B2 Dated Feb. 20, 2007 discloses a steam generator comprising a heating unit, pump adapted to deliver a controllable flow of water from a water supply into the heating unit and an outlet for steam from the heating unit. The unit comprising of a housing, a heating element disposed in the housing and a conduit for water and steam extending from the inlet to the outlet; the conduit including a passage way extending in an elongated path in contact with or adjacent the heating element; wherein the housing comprises two portions releasably secured together to provide a channel between the portions to receive the heating element and to further provide the passageway.

The surface area that can be heated is limited and the evaporation efficiency is less. Steam generators with submerged electric resistors have draw backs of higher start up times running to about 10 minutes and have an added problem of overheating in absence of water and scaling. Dragging of water drops is an occasional problem due to existence of boiling.

WIPO patent application WO/2010/119405 A2 published Oct. 21, 2010 discloses an electric steam generator heating element for heating water to be evaporated, consisting of an electric resistor inserted in a profiled base of a support, fixed in a hole obtained in one of the vertical walls of the container for heating water. Though this device claims many improvements, it still has many limitations like submerged heating element. Limited contact area, complicated manufacturing procedure.

U.S. Pat. No. 5,063,609 discloses a steam generator comprising, a plurality of stacked, interconnected, vertically-oriented liquid-holding chambers, there being a top chamber and a bottom chamber, each chamber having means for heating the water in each chamber to create steam in each of said chambers, with heating means immersed in liquid in each chamber. Here the steam produces from a lower chamber to the chambers above is transferred prior to releasing said steam from the collection zone. Though this device claims efficiency, the bulk of the water is heated and thereby reducing its efficiency.

In US Patent Application 20050178761 A1 relates to a superheated vapor generator having a tubular, vertically extending container with high frequency induction heating coil wound around the container. A heating medium which is heatable by electromagnetic conduction is placed in the container. A number of vapor passages extend through the heating medium longitudinally of the tubular container. The tubular container has a heating section with the heating coil and a non-heating section under the heating section. Material for superheated vapor is supplied through a supply passage from a position above the heating medium to the non-heating section. A passage structure is provided in the non-heating section for flow of material supplied through the supply passage there through into the vapor passages of the heating medium. A discharge passage is formed above the heating medium. A discharge passage is formed above the heating medium for discharging superheated vapour. It can be seen that the device still has to depend on heating the bulk of water first and then evaporate to and superheat resulting in poor efficiency.

In U.S. Pat. No. 4,724,824 dated 16 Feb. 1988, an instantaneous steam generator is disclosed which has a plurality of heated channels having open tops. Each channel has a base having a steam generation surface with substantially parallel, sharp transverse ridges. The steam generation surface is heated to a temperature substantially above that at which an insulating vapor barrier forms between the surface and a water layer there above. The water flow is directed transversely over the ridges so that the vapor layer is separated from the water layer above and so that the water is instantaneously converted into steam rather than riding on an insulating layer of water vapor. The channels can be enclosed in a box having openings. The box is pressurized by a blower drawing relatively cool, ambient air so that relatively wet steam is distributed throughout the entire interior volume of a large oven. Control apparatus for heating the channels and controlling the water flow thereto are described. The instantaneous steam generation has a short regeneration period which allows re-steaming of an oven during a baking cycle however it is a very complicated unit and lacking in ease of manufacture. Also efficiency of evaporation is low.

US patent application 20110274416 A1 dated Jul. 9, 2010 disclosing a steam generator includes a body defining therein a flow passage having an inlet and an outlet, a heater installed in the body and adapted for heating water being guided through the inlet of the flow passage into the inside of the flow passage into steam for enabling steam generation to flow out of the outlet of the flow passage, and at least one friction unit mounted in the flow passage and movable by generated steam to rub against the inside wall of the flow passage and to remove water scale from the inside wall. Thus, the steam generator uses the friction unit to remove water scale from the inside wall of the flow passage during operation, avoiding water scale accumulation and prolonging the lifespan. Though inefficient in energy utilization, the device may operate for large scale operations. But on a small scale, the manufacture may be more cumbersome.

Hence scope exists to simplify the system to provide a very efficient, compact, portable and economical steam generator Summing up, the prior art disclosures suffer from the following often observed limitations 1) Construction requires high pressure pumps, pressure vessels, seamless pipe lines and insulated body in addition to being, expensive to construct.
2) The heating electrode is submerged in water resulting in scaling on heater and severe bubbling resulting in droplets of water in steam and also early heater failure
3) Very limited contact surface area for efficient evaporation to take place
4) Water stored for evaporation is heated continuously.
5) Poor energy utilization
6) Rigorous safety standards to be followed.

To overcome the above deficiencies, I have come out with an electrically operated low pressure steam generator which ensures maximum energy efficiency, minimum or low operating pressure, increased safety, adaptability to different process, simplicity in construction and, easiness in control on the parameters.

The problems of the existing known conventional steam generators can be solved by the present invention.

Increased interest in using steam for cleaning as a replacement of Chemicals in this enviro-conscious industry, using steam for warming food and for sterilizing objects or spaces, and superheated steam for drying, curing, beauty salons and Spa, and special applications like high purity water production, electronic chip cleaning etc, has made it necessary to generate more steam with less power in a safe environment. The electrical steam generator of the present invention offers a simplified pressure less superheated steam generation unit which can also function as a batch type unit when so desired. This device of the present invention is useful in many ways in different applications like, steam cleaning, humidification of an enclosed space, sterilization, mushroom farming, incubators, green houses, heating curing applications, other industrial needs, pure water generation etc.

A simple, electrical low pressure high temperature steam generator with limited components, will not only help in increased safety of operation, but also reduce the size, and weight, simplify the construction, thereby reduce manufacturing cost, while increasing the efficiency. Hence it is very important to have a steam generator which is simple in construction with less number of components wherein, The steam generator does not require high pressure boilers and accessories to generate high temperature steam The steam generator would be compact in size Then steam generator will be easy to assemble and dissemble The steam generator need not have too much of metallic components in and around the heat source.

High energy efficiency

The surface area of the steam generating body is considerably high while its heat mass is low.

Steam can be made to pass through a moist body within the system itself thereby increasing its wetness where required.

The steam generator does not waste heat to preheat any stored water.

The water reaching the hot zone is necessarily evaporated.

The steam generator is very safe even while generating super heated steam

The steam generator is very easily portable.

The steam generator leaves behind a very small foot print.

Such a device would be of immense help to science and technology and to the industry on the whole.

Therefore the main object of the present invention is to provide a large evaporating surface area in a small volume by means of a porous ceramic body absorbing water to increase the steam generating efficiency of the device, Another objective of the present invention is to produce super heated steam while totally avoiding usage of high pressure boilers, high pressure pumps, valves, pressure gauges etc and complicated operations.

Another objective of the present invention is to ensure that bulk movement and bulk heating of water is totally avoided Another objective of the present invention is to provide a porous body ceramic honeycomb made of alumina, cordierite, clay, and steatite, and zirconia, mullite as the medium to absorb and hold water in a very fine dispersion Yet another objective of the present invention is to employ thin walled ceramic honeycomb in one piece or more number of pieces stacked in a predetermined manner with all channels parallel to one another while the channel cross section is square or rectangular or hexagonal or triangular or round etc Yet another object of the present invention is to employ any porous water absorbing ceramic body to increase the area of water dispersion and thus increase the steam generating area and employ it as a means to generate steam in the steam generator of the present invention.

Another object of the present invention is to have one or more electrical resistance heating electrodes in the form of electrical resistant wire, strip, rod in a straight line, zig zag or coiled fashion or tube heaters to provide the required heat for evaporation.

Yet another objective of the present invention is to provide means for steam to pass through a moist medium to produce low temperature wet steam where ever required.

Yet another objective of the present invention is to ensure that the entire electrical energy input is almost instantly converted to steam energy and there is a minimum heat mass in the steam generating body.

Yet another objective is to avoid or minimize pre-heating of whatever little free water body there is in the steam generator.

The above mentioned objectives of the present invention have been achieved based on my findings that the porous ceramic honeycomb monolith absorbs water and the pores present in the body behave like a bunch of capillary tubes network and suck up maximum quantities of water along its channel walls when the axis of the honeycomb channels are vertically oriented. The present invention allows installing of heating element in horizontally aligned spaces created by drilling or digging out required portions from the ceramic honeycomb monolith.

SUMMARY OF THE INVENTION

According to the present invention, the improved and energy efficient electrically operated high temperature steam generator comprising:
a) a main body defined by side wall, roof and open bottom, securely fixed to the rim of water holding tray, by means of a joint, the tray capable of holding water while the roof of the main body is provided with one or more steam outlet nozzles to allow the steam generated to emerge out of the steam generator.
b) a porous ceramic honeycomb with plurality of parallel channels, where one end of all the channels is always submerged in water in said water holding tray, and the other end of most of the channels open to the roof of the main body;
c) an electrical resistance heating element inserted into grooves or holes created in said ceramic honeycomb such that surface of the heating element is in close contact with the ceramic honeycomb, while the bottom most part of the electrical resistance heating elements always above the maximum level of water in the tray and both ends of the heating element are terminated at terminal ends and the terminal ends are connected to the power source to generate steam from water and the steam generator body is properly grounded.

Accordingly when water is pumped into the tray of the steam generator through the water inlet pipe, water level rises up to the maximum water level position after which the excess water will drain out from the drain pipe or overflows at the lip and maintains the water level at a constant position. When the water comes into contact with the porous ceramic honeycomb body, the porous ceramic body will immediately start absorbing water and due to the fine interlocked pores in the body and the body acts like a multiple capillary network arrangement, sucking up water to all the dry portions of the ceramic honeycomb, water absorption will be preferentially high along the vertical direction while water movement will be slow in the horizontal direction due to the existence of wall junctions. Since the ceramic honeycomb provides a very high surface area because of its various walls and channels, along with the inherent porosity of the low density ceramic material, a relatively high surface area and consequently a high spread of absorbed water is created.

When the electrical heating element is energized, the walls adjacent to it will get heated up and the water in its vicinity is immediately vaporized and the vapor travels up the channels towards the roof of the steam generator. The dried up portion of the Ceramic honeycomb is immediately wetted due to water present around the dry area. This action goes a continuous mode as long as the heating element is kept energized and water level is maintained. The rate of steam generation and quantity of steam generation are very easily controllable by varying power levels, heating element design as well as the ceramic honeycomb configuration and water level.

According to another preferred embodiment under the invention a secondary heating unit mounted in a frame and resting on supports brackets at a distance of at least one inch or higher above the ceramic honeycomb in such a fashion that the steam emerging out of the vertically oriented channels of the ceramic honeycomb will passes through the secondary heater which increases the steam temperature considerably. Water is continuously fed to the tray through the inlet port and the excess water drain pipe helps in maintaining constant water level and the steam outlet nozzles in the roof of the main body of the steam generator allows steam to be conveyed to the usage area. The Roof comprises of one or more Nozzles as means to allow generated steam to pass through for further use. Another preferred embodiment offers a single piece of porous low density ceramic body in a housing made of SS 316 L material having a means to store small and limited quantities of water and means for inlet and outlet of water, while the porous ceramic body is provided with means in the form of holes, to install electrical resistance heating element in the holes in such a fashion that the bottom most part of the heating element is always above the maximum water level in the tray of the housing, and the housing having means in the form of nozzles for discharge of the steam generated for further use.

In yet another preferred embodiment under the invention a square channel ceramic honeycomb is made of alumina, cordierite, mullite, porcelain or clay and has low body density and small channel cross section. Here the channels of the ceramic honeycomb are parallel and are vertically oriented. The electrical heating element is inserted into holes that are drilled through the ceramic honeycomb in such a fashion that the holes are aligned perpendicularly to the channel axis and all the holes in each plane are parallel and also such that the heating element will be at least 10 mm above the maximum water level when the ceramic honeycomb is placed in water with its channel axis vertically oriented.

It is observed that by this invention we can generate super heated steam without any application of pressure or pressure vessels and without any heat loss to the steam during its travel to the superheating stage that too without any moving parts or accessories in the steam generator. This makes it a most convenient device, as it can be scaled up or extrapolated for higher volumes of steam, higher temperatures of steam, miniaturized models, fit to scale at any place, and offers the best solution for making the steam generation an easy task.

The improved electrical low pressure super heated steam generator as disclosed in this invention provides minimum assembled components; the evaporation rate is very high without any bubbling or rigorous reaction and is highly energy efficient. The inventions is not only efficient but also offers various opportunities by varying temperatures, production of dry steam or wet steam etc by simple manipulation of the heater temperature and/water in the tray Besides the above mentioned embodiments which are disclosed herein, various modified configurations involving the honeycomb thickness, wall thickness of the honeycomb channels, honeycomb pore density, heater configuration, heater dimensions or arrangements, subtle changes in connecting the heater elements to facilitate conversion from series to parallel mode, AC power supply, DC power supply etc can be employed as per existing need of the device.

BRIEF DESCRIPTION OF THE DRAWINGS

The Invention is described with reference to FIGS. 1 to 7 of the drawings.

DETAILED DESCRIPTION OF THE INVENTION

Other features and advantages of the present invention should become apparent from the following description of the preferred process and read in conjunction with the accompanying drawings, which illustrate, by way of example, the principles of the invention.

Figure 1:
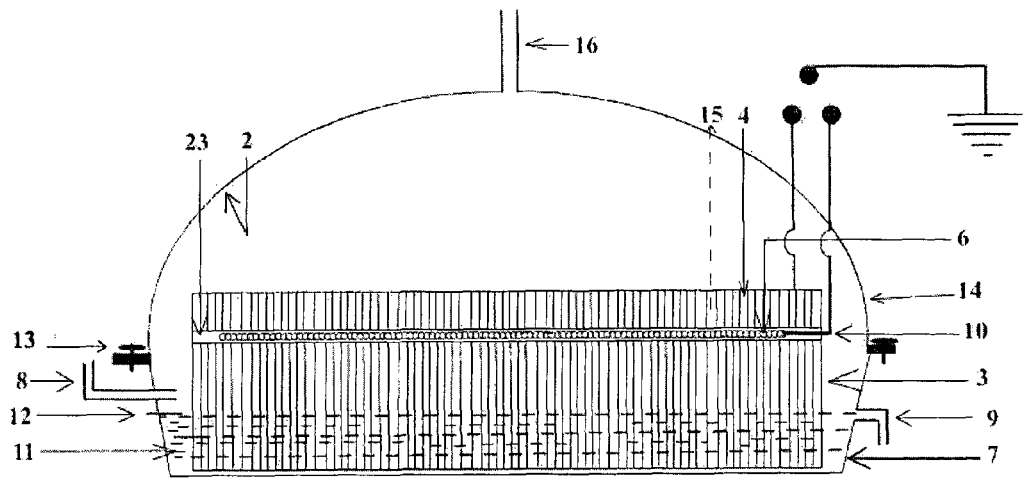
FIG. 1 shows the basic structure of the preferred embodiment of steam generating device FIG. 2.*a* shows front cross-sectional view of another preferred embodiment of steam generating device along with a secondary electrical resistance heater (21) for production of high temperature steam.

Referring to the most preferred embodiment shown in FIG. 1, the energy efficient electrically operated steam generating device (1) is having a main body (14) made from SS316 L or equivalent material, housing a porous ceramic honeycomb (3) with plurality of parallel channels (4) all vertically oriented and having electrical resistance heating element (6) installed inside the drilled holes (23) in the ceramic honeycomb (3) in such a way that the heating element(6) and the holes (23) are both mutually parallel and both are perpendicularly positioned to the axis (15) of the honeycomb channel (4). The ceramic honeycomb (3) is positioned inside the water (11) in the tray (7) and the maximum water level (12) is always maintained well below the bottom most part of the electrical resistance heating element (6). The tray (7) with water inlet pipes (8) and excess water drain pipe (9) ensure maintaining constant level (12) of water (11) in the tray (7). The main body (14) is securely bolted to the rim of the tray (7) at the joint (13). The main body (14) has nozzles (16) positioned in the roof (2) to allow the steam generated to emerge out. Both ends of the heating element (6) are terminated at terminal ends (10) and the terminal ends (10) are connected to the power source and the steam generator body is properly grounded In another preferred embodiment under the invention shown in FIG. 2A of an energy efficient electrically operated steam generating device (1) wherein a ceramic honeycomb (3) with plurality of parallel channels all vertically oriented, has electrical resistance heating element (6) installed inside the through and through drilled holes (23) in the ceramic honeycomb (3) in such a way that the heating element and the holes (23) are both perpendicularly positioned to the axis of the honeycomb channel (4). The ceramic honeycomb (3) is positioned inside the water (11) in the tray (7) and the maximum water level (12) is always well below the bottom most part of the electrical resistance heating element (6). Water inlet pipe (8) and excess water drain pipe (9), ensure constant level of water in the tray (7) of the steam generating device (1). It also shows multiple steams outlet nozzles (16) located in the roof (2) of the device (1). The figure shows steam (20) reaching up to the roof (2) and escaping through the nozzles (16) and the electrical leads necessary for energizing the electrical resistance heating element (6). A secondary known heating element (21) is arranged on support brackets (22) at a distance of not more than an inch from the top surface of the ceramic honeycomb (3). The secondary heating element (21) will have sufficient inter element spacing to allow any fluids to pass through without excessive resistance. One or more steam outlet nozzles (16) in the roof (2) of the steam generator (1) will allow steam to emerge to the usage area.

Figures 2A, 2B:
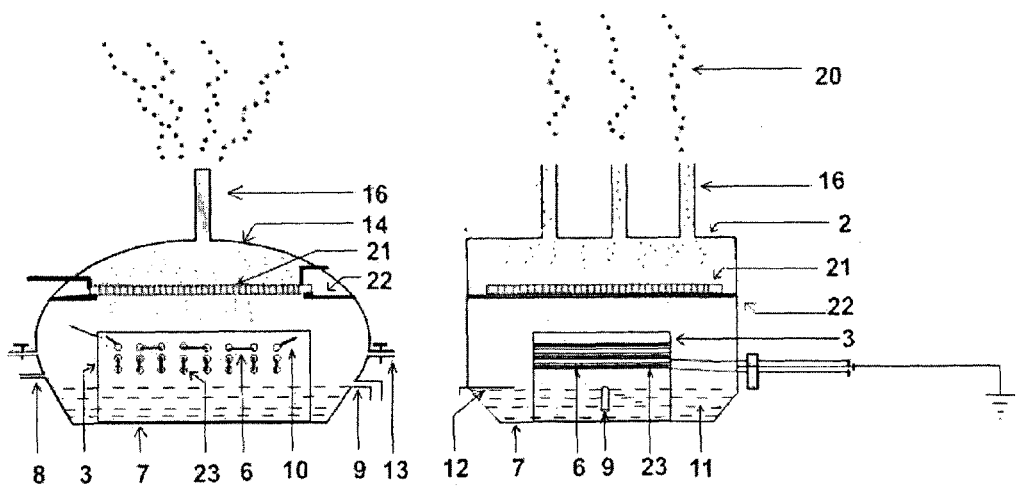
FIG. 2.*b* shows side cross sectional view of another preferred embodiment of steam generator along with a secondary electrical resistance heater (21) for production of high temperature steam.

A cross sectional view of the preferred embodiment under the invention as shown in FIG. 2B highlights the multiple layers of electrical resistance heating element (6) from the side and one manner of steam outlet nozzle (16) construction in the roof (2) of the main body (14) of the steam generating devise (1)

Figure 3:
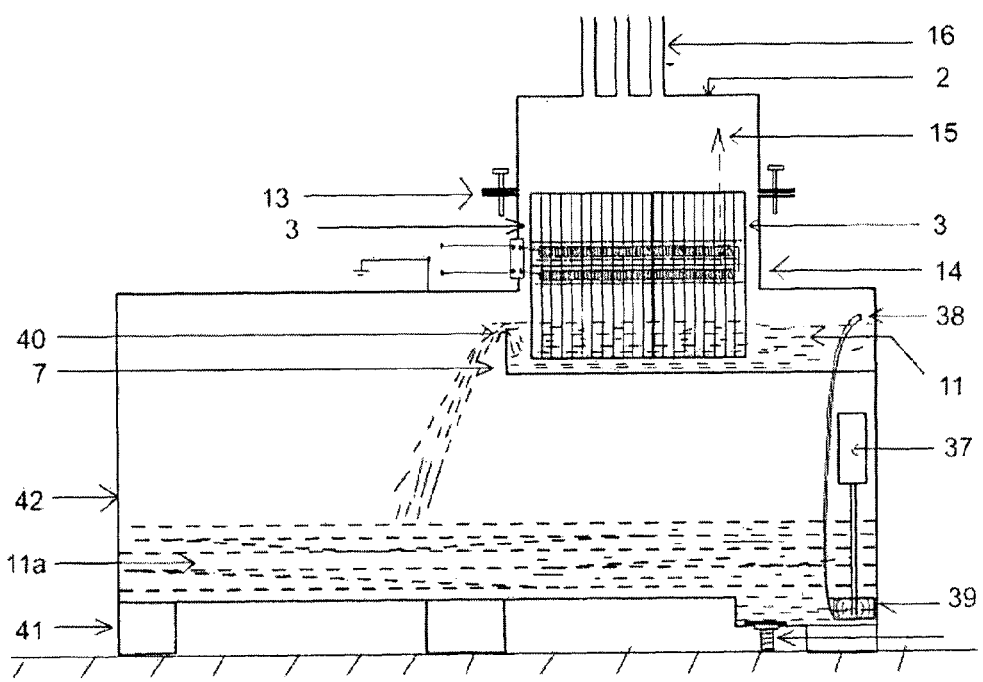
FIG. 3 shows one more preferred embodiment of the steam generator with a tray (7) having a over flow lip (40) to ensure maximum water level at constant position and a secondary larger reservoir (42) of water.

In one more preferred embodiment under the the invention shown in FIG. 3 the main body (14) is in communion with a larger reservoir (42) of water which in turn houses a pump (39) driven by a motor (37). The pump (39) pumps up the water (11) into the tray (7) which contains the Ceramic Honeycomb (3). The ceramic honeycomb (3) will be resting in the tray with its channel axis (15) vertically oriented and one end of all the channels (4) [shown in FIG. 4] submerged in the water (11) in the tray (7). The tray (7) has a lip (40) on one of its walls which has a reduced height than the rest of its walls, which limits the water level by overflowing excess water back into the larger reservoir (42) which in turn holds the bulk of the water (11a). The ceramic honeycomb (3) has holes (23) drilled across its width which will house the electrical resistance heating element (6) [shown in FIG. 4] The nozzles (16) in the roof (2) of the generator will allow steam to emerge out to the usage area.

Figure 4:
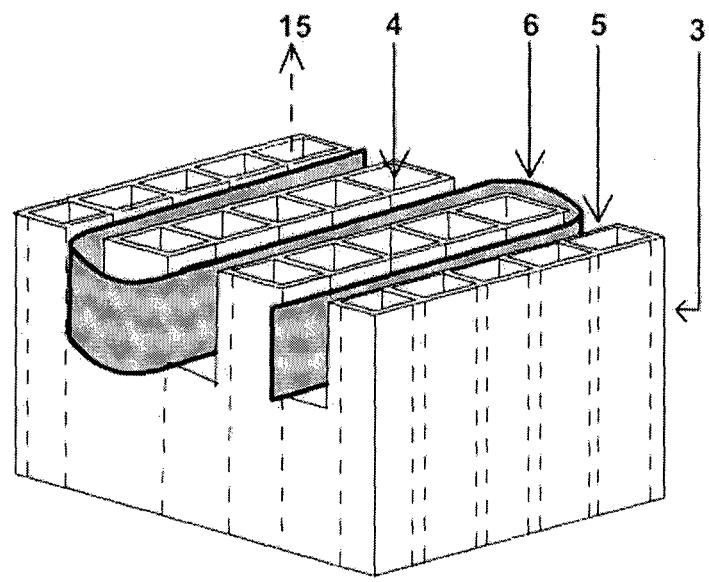
FIG. 4 shows a ceramic honeycomb (3)' with provision of holes (23) for arranging electric resistance heating element.

A magnified image of a part of a square channel ceramic honeycomb (3) is shown in FIG. 4. It is made of alumina, cordierite, mullite, porcelain or clay having low density body and parallel channels (4) with low wall thickness, arranged in such a fashion that the channels (4) of the ceramic honeycomb (3) are always parallel and are vertically oriented. One or more groves (5) are created in the top side of the ceramic honeycomb such that the groves (5) are all at one horizontal level and are aligned perpendicularly to the channel axis (15). The electrical heating element (6) is inserted into these groves (5) in the ceramic honeycomb (3 and are also aligned perpendicularly to the channel axis (15) and also such that the heating element (6) when positioned in these grooves (5) will be about 10 mm above the maximum water level when the ceramic honeycomb (3) is placed in water with its channel axis (15) vertically oriented. The electrical heating element (6) is terminated at terminal leads (10) at both its ends.

Figure 5:
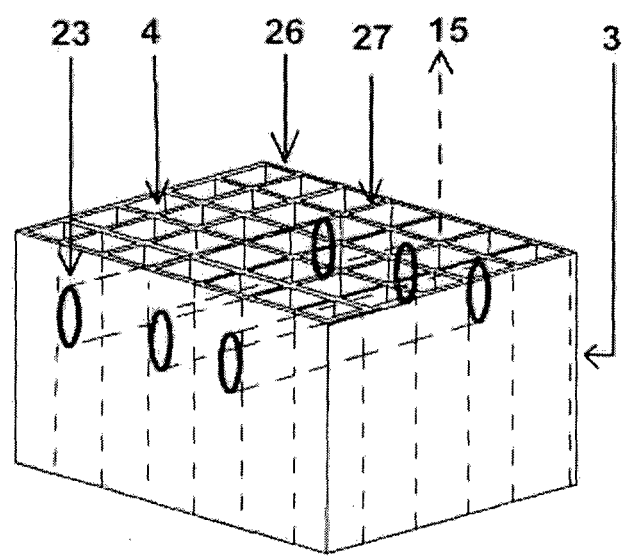
FIG. 5 shows a ceramic honeycomb (3) with one more method of heating element arrangement.

A square channel ceramic honeycomb (3) shown in FIG. 5 is also made of alumina, cordierite, mullite, porcelain or clay having low body density and small channel cross section and the channels (4) of the ceramic honeycomb (3) are parallel and are vertically oriented. The electrical heating element is inserted into holes (23) that are drilled through the ceramic honeycomb (3) in such a fashion that the holes (23) are aligned perpendicularly to the channel axis (15) and all the holes (23) are parallel and in one horizontal plane and also such that the heating element (6) will be at least 10 mm above the maximum water level when the ceramic honeycomb (3) is placed in water with its channel axis (15) vertically oriented.

Figure 6A:
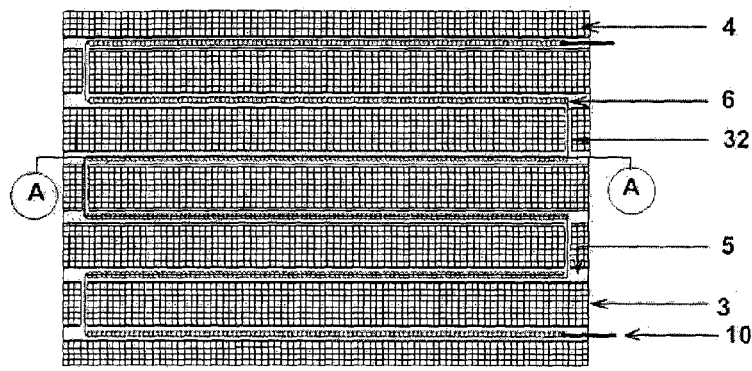
FIGS. 6*a*, 6*b*, & 6*c* shows three views of a ceramic honeycomb (3) with heating element arrangement.
Figure 6B:
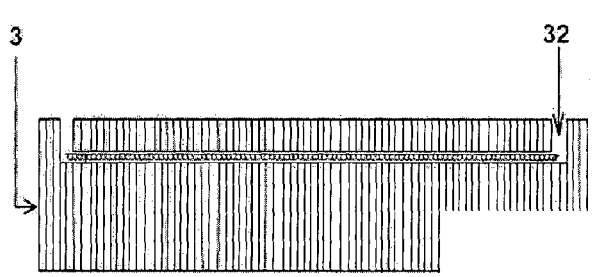
Figure 6C:
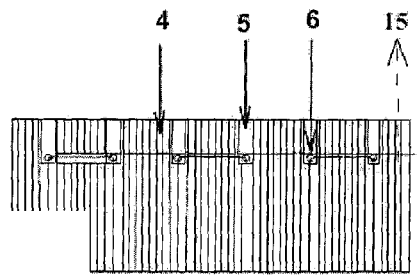

Three views of one embodiment of the present invention are shown in FIGS. 6A, 6B and 6C, where a ceramic honeycomb (3) has grooves (5) in a parallel arrangement at one end of the ceramic honeycomb channels (4) and the grooves have a passage (32) at both its ends for the heating element to pass from one grove (5) to the next groove (5) when a electric resistance element (6) in the form of a strip, wire, coil or rod is inserted in a serpentine and parallel fashion, in such a way that the bottom most part of the heating element (6) in all the grooves is always well above the maximum water level, when this assembly is placed in the water tray of the steam generator with the grooves facing the roof of the steam generator (1) of FIG. 1. The resistance heating element (6) is terminated at both its ends by way of terminal ends (10). The open area of the groove over the heating element is covered with a known ceramic fiber stuffing. (not shown in the drawing)

In a preferred embodiment under the invention a secondary electrical heater (21) is bare coils of any known electrical resistance materials arranged in a frame supported on brackets (22) at a height of more than one inch over the ceramic honeycomb (3) in such a fashion that most of the steam passes through the bare heater coil arrangement and thus increase the steam temperature.

The secondary electrical heater (21) is a single or plurality of ceramic honeycomb heaters formed from honeycomb structures or monolith body made from electrically insulating and thermally resistant ceramic material, each provided with plurality of vertical parallel passages or channels for the flow of fluid and a row of horizontal parallel groves formed in the adjoining walls in which heating element is positioned and arranged in a frame supported on brackets (22) at a height of more than one inch over the ceramic honeycomb (3) in such a fashion that most of the steam passes through the bare heater coil arrangement and thus increase the steam temperature.

Figure 7:
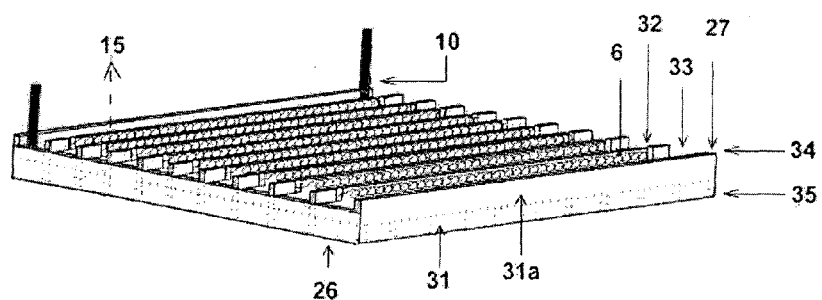
FIG. 7 shows the construction of an exemplary secondary electrical resistance heater (21) ie an ceramic honeycomb monolith heater that is employed to superheat the steam in one of the preferred embodiment under the invention.

The secondary heating element (21) disclosed as per my earlier Indian patent application 240/CHE/2008 dated Jan. 30, 2008 & U.S. patent application Ser. No. 13/321,618 dated Nov. 21, 2011 shown in FIG. 7 can also be made use of in the present invention. It comprises of a single ceramic honeycomb monolith body (31) made from electrically insulating and thermally resistant ceramic material, the body being provided with plurality of parallel channels (4) for the passage of air. Said channels (4) are extending parallel to one another from one end (34) of the honeycomb (31) to the other end (35) of the honeycomb 31, wherein each of these channels (4) being formed by the four walls constituting of two sets of parallel walls ie The transverse walls (26) and longitudinal walls (27). The entire set of either the transverse walls (26) or Longitudinal walls (27) are extending away from one end of the honeycomb (34) or (35) there by making the walls (27) or (26) projecting out of the honeycomb (31).

The resulting extended walls (27) or (26) being essentially parallel to one another at any end, as the case maybe, the parallel walls (27) or (26) being always integral to the unmodified part (31a) of the honeycomb (31) and cumulatively forming into a row of parallel groves (33). Each grove originating from two adjacent walls (27) or (26) is capable of holding an electrical heating element (6) along its length, and a passage way (32) being provided at both the ends of the wall (27) or (26), for the passage of the heating element (6) from one grove to other. The heating element (6) is terminated by terminal electrodes (10) at both its extreme ends. This forms the improved heater (21).

Working of the Device

The working of the electrical superheated steam generators of the present invention is very simple and does away with the complicated construction of high pressure steam boilers and associated pressure related accessories and also avoids the various methods adopted to disperse the water by different means like atomization, misting, high pressure spray of water etc.

In the present invention, the water (11) stored in the tray (7) does not come directly into contact with the heating element (6) at all and gets heated very negligibly. The Heating element (6) is always maintained well above the maximum water level (12) in the tray (7). The ceramic honeycomb (3) having plurality of parallel channels (4) and with the channel axis (15) always vertically oriented, rests in the tray (7) with one end of all the channels (4) submerged in water (11) and the other end open to the roof (2) of the steam generator (1). When water is fed to the tray (7), through the inlet pipe (8) the water fills up the tray (7) to the extent of the drain pipe (9) of FIG. 2 or the overflow lip (40) of FIG. 3 in the tray wall thus maintaining the maximum water level (12) within limits. Owing to the inherent porous nature of the ceramic body of the honeycomb (3), water (11) is absorbed instantaneously and water absorbed is sucked up preferentially along the walls (26 and 27) and parallel to the axis of the channel. However water also gradually travels across the wall junctions. When the heating element (6) is energized, the honeycomb portion containing the electrical heating element (6) is heated up by the heating element (6) and heat builds up along the walls (26 and 27) and travels across the junctions of walls (26 & 27) of the ceramic honeycomb (3). Thus heat is distributed around all the walls. The rising water in the walls ((26 & 27) gets evaporated on reaching the hot portion of the ceramic honeycomb walls and the vapour travels up the rest of the open channel (4), in the process heating and evaporating more water along the way. Steam is generated very efficiently as the heat to water ratio is very high and evaporation rate is high. Steam flows out of the channels of ceramic honeycomb heater (3) and passes through the secondary heater (21) and further travels up to the steam outlet nozzle (16) or the next stage of operation depending upon the arrangement. Any condensate if formed on the inside walls of the generator body (1) trickles back to the tray to be reheated.

Dry superheated steam is generated by increasing the temperature of the heating element (6) The dry steam is in direct communication with the secondary heater (21) that is installed just above the ceramic honeycomb (3) and the steam passes through the electrical resistance heating element (21). Very high temperature steam is generated by increasing the temperature of the secondary heating element (21). The steam temperature will be directly proportional to the temperature of secondary heating unit (21).

The Steam generator of the present invention throws open various possibilities of simplifying most of the steaming and humidifying processes that are in vogue and are existing simply due to non availability of options.

Advantages

1) The invention throws open many new possibilities of employing steam in hitherto untried applications due to the very fact that no high pressure boilers or no pipelines or large hot water body is required to generate super heated steam.
2) No other fuel or heat form is required. No prior misting is needed.
3) No boiling of water occurs in this device, hence no bubbling and no water droplet carry over
4) Almost instantaneous steam generation, negligible start up time required, no special precautions required before switching 'on' and 'off' the system.
5) Very low carbon footprint
6) Very energy efficient as the total energy is consumed to evaporate the water and nothing is wasted in preheating stored water. Higher quantities of water can be evaporated per unit energy consumed as compared to existing processes.
7) Very easily portable as the total unit is very light as compared to pressurized boilers. Can be miniaturized very easily.
8) Very low temperature steam to very high supercritical steam can be generated in the same system by varying the energy levels applied.
9) Very useful in generation of ultra pure steam or ultra pure water for clinical applications.
10) Very economical.
11) Hazardless generation of high temperature steam. Very simple device and will not be covered by stringent boiler regulations.

In addition while the invention has been described in combination with particular embodiments, it is evident that the invention is not limited to the embodiments described and that one can make suitable modifications without departing from its main scope and its spirit of porous ceramic body absorbing water will offer higher surface area of water to get higher evaporation rates though it can be proved that ceramic honeycombs are preferably most suitable for the process of steam generation while a secondary heating unit will allow production of super heated steam without any pressure.

We have brought out the novel features of the invention by explaining some of the preferred embodiments under the invention, enabling those in the art to understand and visualize our invention. It is also to be understood that the invention is not limited in its application to the details set forth in the above description or as illustrated in the drawings. Although the invention has been described in considerable detail with reference to certain preferred embodiments thereof, various modifications can be made without departing from the spirit and scope of the invention as described herein above and as defined in the following claims.

I claim:

1. An energy efficient electrically operated low pressure high temperature steam generator, comprising:
   a) a main body (14) defined by side wall, roof (2) and open bottom, securely fixed to the rim of water holding tray (7) by means of joint (13), the tray (7) capable of holding water while said roof (2) of the main body is provided with one or more steam outlet nozzles (16) to allow the steam generated to emerge out of the steam generator;
   (b) a porous ceramic body (3) with a plurality of channels (4), where one end of all the channels (4) is always submerged in water (11) in said water holding tray (7), and the other end of most of the channels open to the roof (2) of the main body (14);
   (c) an electrical resistance heating element (6) inserted into grooves (5) or holes (23) created in said ceramic body (3) such that surface of the heating element (6) is in close contact with the ceramic body (3), while the bottom most part of the electrical resistance heating element (6) is always above the maximum level (12) of water (11) in the tray (7) and both ends of the heating element are terminated at terminal ends (10) and the terminal ends (10) are connected to the power source for heating the water to create steam and the steam generator body is properly grounded.

2. An energy efficient electrically operated low pressure steam generator as claimed in claim 1, wherein said porous ceramic body comprises a low density porous and absorbent ceramic body.

3. An energy efficient electrically operated low pressure steam generator as claimed in claim 1, wherein said porous ceramic body comprises a porous ceramic honeycomb.

4. An energy efficient electrically operated low pressure steam generator as claimed in claim 3, wherein a secondary electrical heater (21) of suitable design is arranged at a distance of one or more inches above the ceramic honeycomb (3) on support brackets (22) in such a fashion that the steam emerging out of the vertically oriented channels (4) of the ceramic honeycomb (3) will pass through the secondary heat (21), which increases the steam temperature considerably while water is continuously fed to the tray (7) through the inlet port (8) and constant water level (12) is maintained by means of excess water drain pipe (9) or overflow lip (40) while the steam outlet nozzle (16) at the roof (2) of the generator allows the super-heated steam to be communicated to the usage area.

5. An energy efficient electrically operated low pressure steam generator as claimed in claim 4, wherein the secondary electrical heater (21) is bare coils of any known electrical resistance materials arranged in a frame supported on brackets (22) at a height of more than one inch over the ceramic honeycomb (3) in such a fashion that most of the steam passes through the bare heater coil arrangement and thus increase the steam temperature.

6. An energy efficient electrically operated low pressure steam generator as claimed in claim 4, wherein the secondary electrical heater (21) is a single or plurality of ceramic honeycomb heaters formed from honeycomb structures or monolith body made from electrically insulating and thermally resistance ceramic material, each provided with plurality of parallel passages or channels for the flow of steam and a row of parallel grooves formed within the ad-joining walls in which an electrical resistance heating element is positioned and arranged in a frame supported on brackets (22) at a height more than one inch over the ceramic honeycomb (3) in such a fashion that most of the steam passes through the bare heater coil arrangement and thus increase the steam temperature.

7. An energy efficient electrically operated low pressure steam generator as claimed in claim 3, wherein the ceramic honeycomb (3) has grooves (5) in a parallel arrangement at one end of the ceramic honeycomb channels (4) and the grooves have a passage (32) at both its ends for the heating element to pass from one groove (5) to the next groove (5) and the electrical resistance heating element (6) is selected from various configurations of heater element like straight wire, rod, coil, strip, tube in single length or multiple lengths or zig zag to provide the required heat for evaporation connected in series or parallel as the design demands and the bottom most part of the heating element (6) in all the grooves (5) is always well above the maximum water level, when this assembly is placed in the water tray of the steam generator with the grooves (5) facing the roof (2) of the steam generator.

8. An energy efficient electrically operated low pressure steam generator as claimed in claim 3, wherein body (14) is in communion with a larger reservoir (42) of water which in turn houses a pump (39) driven by a motor (37) capable of pumping the water (11) into the tray (7) with the ceramic honeycomb (3) while the tray has an overflow lip (40) on one of its walls with reduced height than the rest of its walls so as to limit the water level by overflowing excess water back into the larger reservoir (42) which in turn holds the bulk of the water (11a).

9. An energy efficient electrically operated low pressure steam generator as claimed in claim 3, wherein the resistance heating element (6) is terminated at both its by way of terminal ends (10) and the open area of the groove (5) over the heating element (6) is covered with a known ceramic fiber stuffing to reduce heat losses by radiation.

10. An energy efficient electrically operated low pressure steam generator as claimed in claim 3, wherein thin walled ceramic honeycomb in one or more number of pieces are stacked in a predetermined manner with all channels parallel to one another while the channel cross section is square or rectangular or hexagonal or triangular or round.

11. An energy efficient electrically operated low pressure steam generator as claimed in claim 3, wherein said steam generator is capable of producing super heated steam while totally avoiding the usage of high pressure boilers, high pressure pumps, valves, and/or pressure gauges.

12. An energy efficient electrically operated low pressure steam generator as claimed in claim 3, wherein ultrahigh purity water is produced by connecting a known water cooled condenser to the steam outlet nozzles (16).

13. An energy efficient electrically operated low pressure steam generator as claimed in claim 12, wherein it is capable of producing bacteria free water by employing a porous ceramic honeycomb with any known nano-silver coating in the submerged portion of the ceramic honeycomb (3) of the steam generator.

14. An energy efficient electrically operated low pressure steam generator as claimed in claim 3, wherein the main body (14) is made from SS316L or equivalent material, housing said porous ceramic honeycomb (3) made from material selected from alumina, cordierite, clay, steatite, zirconia, and mullite so as to absorb and hold water in a very fine dispersion, with plurality of parallel channels (4) all vertically oriented and having one or multiple layers of electrical resistance heating element (6) installed inside the drilled holes (23) provided in the ceramic honeycomb (3) in such a way that the heating element and the holes are both mutually parallel and both are perpendicularly positioned to the axis (15) of the honeycomb channel (4), the heating element will be at least 10 mm above the maximum water level (12) in the tray (7) while water inlet pipes (8) and excess water drain pipe (9) ensure maintaining constant level water (11) in the tray.

\* \* \* \* \*